Dec. 6, 1938.  A. RINDL ET AL  2,139,208
MILK DISTRIBUTION APPARATUS AND A CAN FOR USE WITH THE SAID APPARATUS
Filed May 19, 1937  4 Sheets-Sheet 4
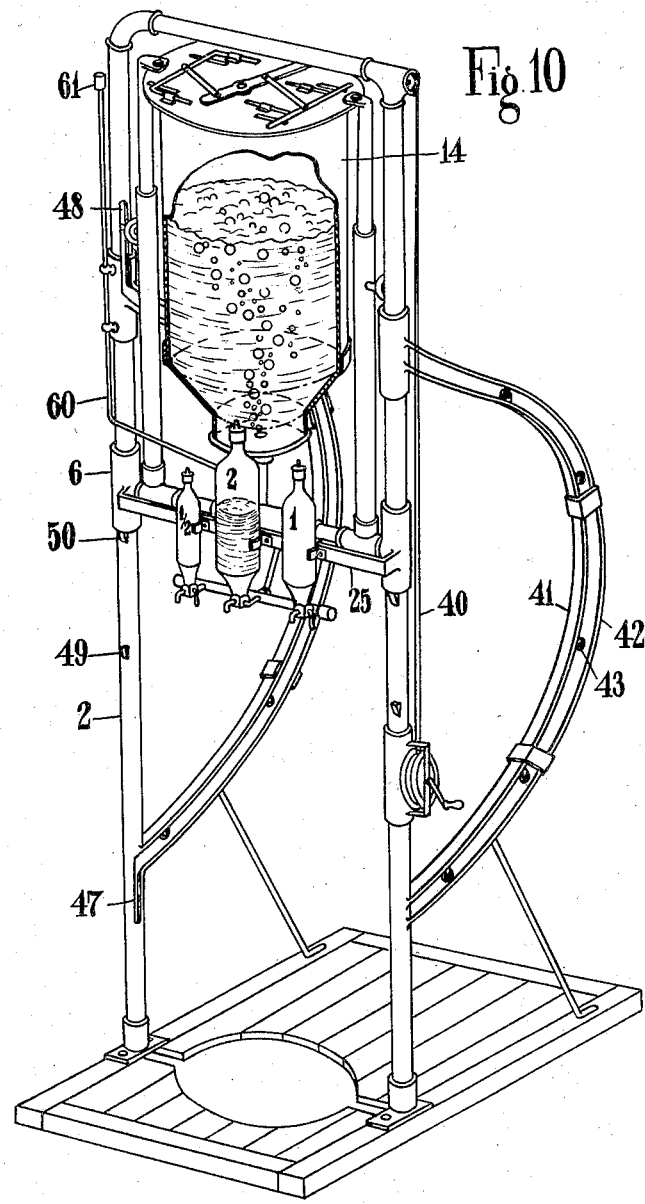

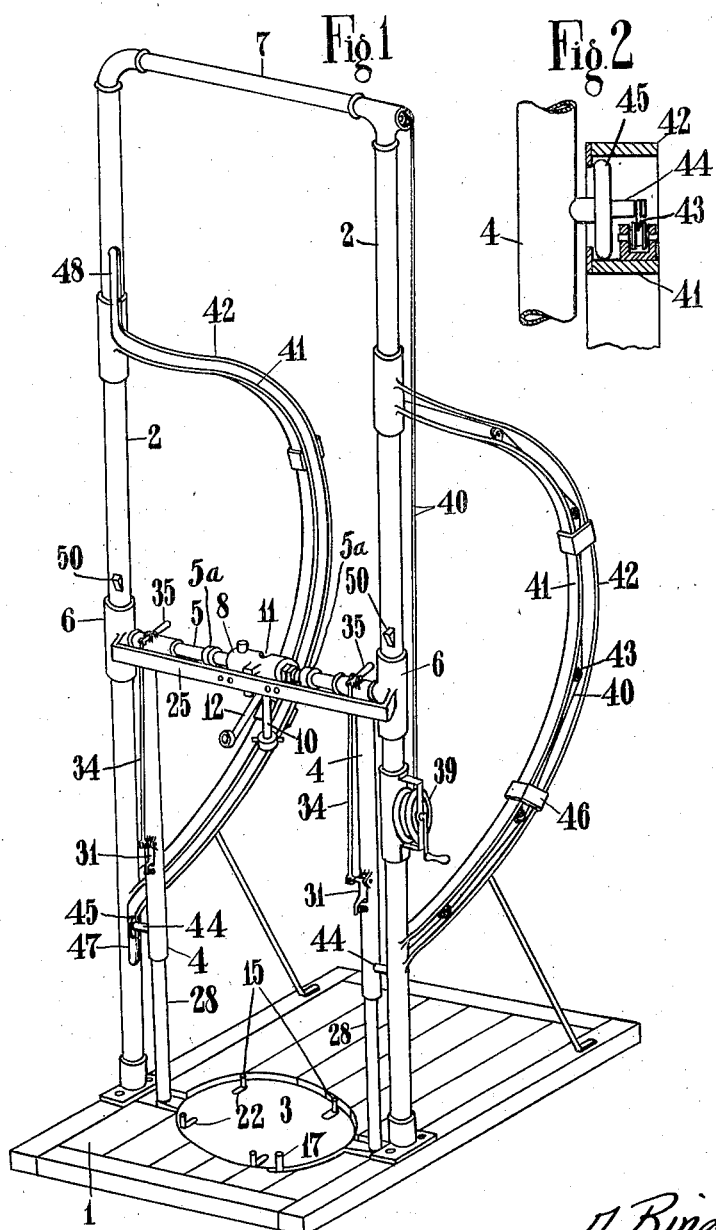

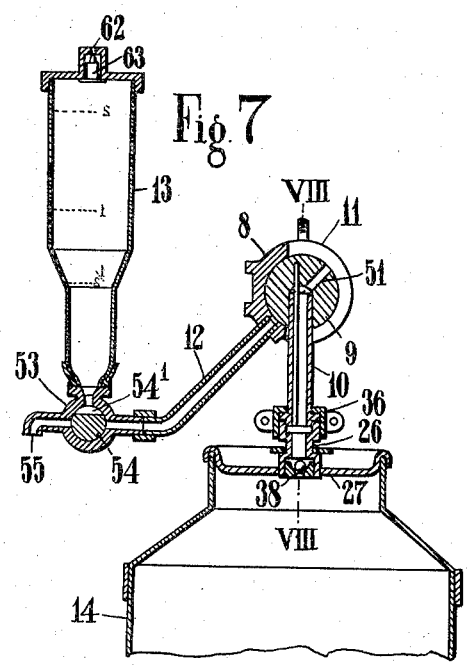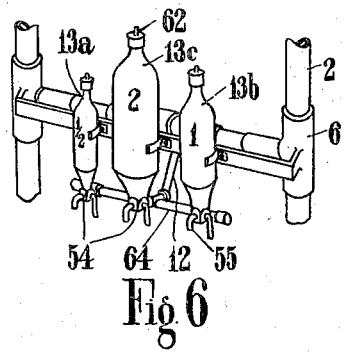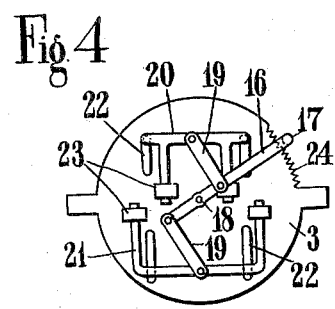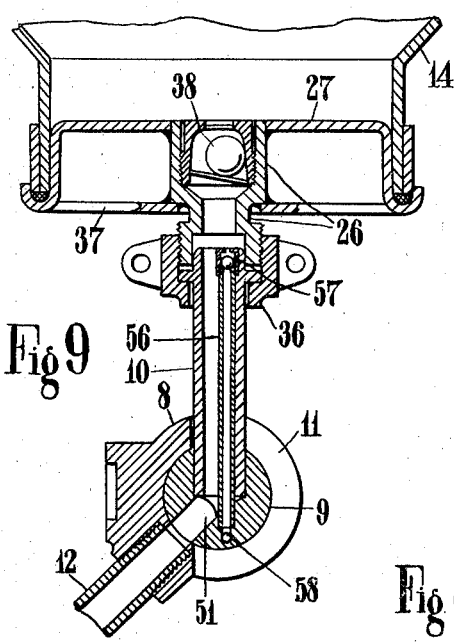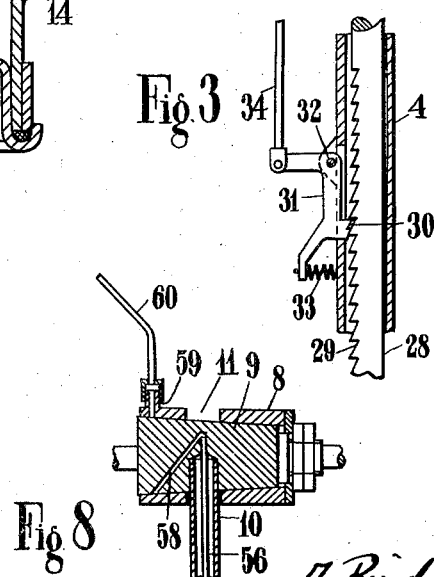

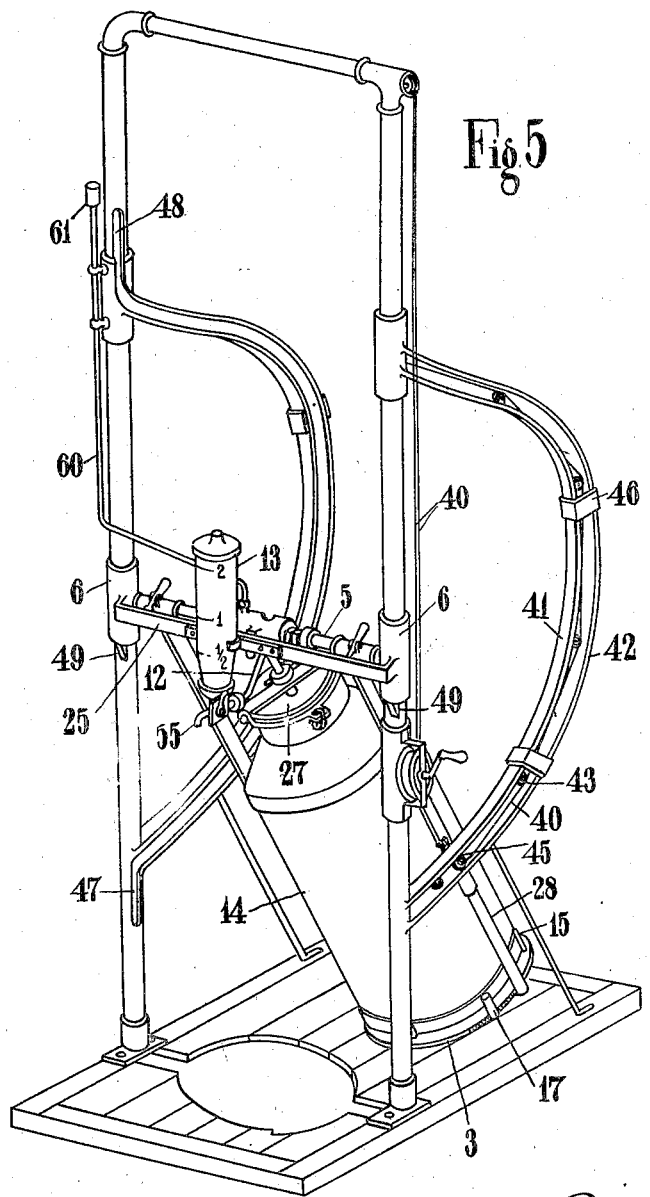

Patented Dec. 6, 1938

2,139,208

UNITED STATES PATENT OFFICE 2,139,208

MILK DISTRIBUTION APPARATUS AND A CAN FOR USE WITH THE SAID APPARATUS

Adolf Rindl and Honorata Rindl, Cieszyn, Poland

Application May 19, 1937, Serial No. 143,627
In Poland May 25, 1936

14 Claims. (Cl. 221—116)

The object of the present invention is to provide a milk delivery apparatus which will enable the milk to be transported and retailed in an improved manner. The milk delivered from the dairy remains in a closed and if desired in a lead-sealed, vessel, being protected against contact with the atmospheric air and hence with dust, volatile substances and microbes contained in the air, up to the moment at which the milk is poured into the vessel put under the can by the purchaser, when the milk is poured in a thin stream, flowing through a tubular outlet provided in the apparatus, according to the present invention, directly into the vessel with a narrow gullet, for instance, into a bottle placed under the outlet. In this way the contact of the milk with the atmospheric air during the transport of the milk from the place of production to the place of consumption will be limited only to the moment in which the milk is poured from the apparatus into the consumer's vessel.

The apparatus according to the present invention may be used in conjunction with the milk cans hitherto usual, the lid thereof being perforated and provided with a tubular member. The can delivered to the town and supplied to the grocer or the like is placed in the apparatus according to the present invention, the tubular member of the can being connected to the corresponding tubular member of the means delivering the milk into the closed measuring tank. The can is screwed in the apparatus upside down, so that when a cock provided for the purpose is turned off, the milk will flow down by its own weight into the measuring tank, the can being rotated through 180°, with the result that the milk is thoroughly agitated, so that the milk lying higher has the same value as regards its fat content as the milk that lies lower. Upon the cock being then turned, the milk will be poured from the measuring tank into the consumer's vessel that has been put under the cock outlet.

In the apparatus according to the present invention, the air flows into the can filled with milk through the same tubular member through which the milk flows from the can into the measuring tank, when the air thoroughly penetrates the milk, causing a movement of the milk in the can, thereby continuously agitating the milk and preventing an accumulation of the fatter milk in the can. The air flows to the said tubular member through a filter which purifies the air mechanically and chemically.

When the milk of one can has been sold out in the retail shop, the empty can is removed from the apparatus and is replaced by another can filled with milk.

The invention is carried into effect by using an apparatus which is provided with one or more measuring tanks having an outlet and a tubular member adapted to connect the said measuring tank to the corresponding tubular member of the can, the said apparatus being also provided with means which enable the can filled with milk to be screwed upside down in the apparatus.

Referring to the accompanying drawings which illustrate the invention, by way of example:

Fig. 1 is a perspective view of the apparatus without the milk can, and with the measuring tank removed;

Fig. 2 is a view of a guiding roller;

Fig. 3 is a sectional view of a detail, hereinafter referred to as the sliding rod;

Fig. 4 is a bottom view of the plate carrying the can;

Fig. 5 is a perspective view of the apparatus with the milk can in the process of screwing it in the apparatus;

Fig. 6 is a perspective view of a modification having three measuring tanks of different sizes;

Fig. 7 is a vertical sectional view of the measuring tank showing the connection between the measuring tank and the milk can in the lower position;

Fig. 8 is a sectional view taken along the line VIII—VIII of Fig. 7;

Fig. 9 is a sectional view of the tubular member of the can in the upper position;

Fig. 10 is a view, partly in section, of the apparatus with the can inverted upside down. The apparatus mainly comprises a support 1 vertical posts 2 and a rotary frame built-up of a plate 3 and rods 4. The said frame is capable of being rotated around an axle 5, which consists of two parts provided at the outside ends with vertical sockets 6 slidingly arranged on the posts 2, which are made of steel tubes and the upper ends of which are connected to a horizontal tube 7. Each inside end of the two parts of the axle 5 is provided with a bearing 5a. In the bearings 5a are rotatably mounted the ends of an axle of a cone 9 which is rotationally mounted in a case 8, as shown in Figures 7 and 8, and connected to a tubular member 10, which during the rotation of the cone 9, slides in a slot 11 provided in the case 8, which slot 11 lies in a plane perpendicular to the axis of the cone 9 and axle 5 around which the frame 3, 4 is rotated. To the same case 8 there is connected a tubular member 12 by means of which the case 8 can be connected to the measuring tank 13, as shown in Figs. 5 and 7.

The milk can 14 is placed upon the plate 3, shown from underneath in Fig. 4, and the bottom of the can is clamped by four bolts 15, as shown in Fig. 1, whereupon the lever 16 is turned by pressing down its projection 17, which is bent upwards. The lever 16 is mounted on a pivot 18 in the centre of the plate 3 and connected by means of pivotally secured connecting rods 19 to sliding members 20 and 21. Each of the sliding members 20 and 21 is connected to two bolts 15 extending above the plate through slots 22. The sliding members 20 and 21 are U-shaped, the limbs thereof being slidably mounted in guides 23. When the lever 16 is turned, the sliding members 20 and 21 are moved one towards the other, so that the can 14 is moved by the bolts 15 exactly into the centre of the plate 3. The lever 16 is provided with a spring ratchet (not shown) which engages with the teeth of the indentation 24 provided on the circumference of the plate 3, so as to prevent the lever 16 and bolts 15 from being moved back.

After the can 14 has been placed in the centre of the plate 3 the axle 5 is lowered together with the sliding sockets 6 and the tubular member 10. The sockets 6 and the case 8 of the cone 9 are connected by means of a flat-iron bar 25 to which is also secured the measuring tank 13. To facilitate the displacement, to the iron bar 25 there are secured cables 40 which are guided on pulleys 39 and are provided at their ends with counterweights which will balance the weight of the bar 25, tank 13 and axle 5, the said counterweights being arranged in the interior of the posts 2. The tubular member 10 is moved downwards and brought into contact with a tubular member 26 secured to the can lid 27. To enable the vertical displacement of the axle 5 to be effected, the rods 4 are adapted to be extended. With this end in view, within the tubular rods 4 there are slidingly arranged rods 28, which are secured to the plate 3. As shown in Fig. 3, each of the rods 28 is provided with a toothed bar 29 adapted to be engaged by a ratchet angle lever 31 pivoted at 32 and having two teeth 30 lying in a slot provided in the rod 4. The lever 31 is continuously pulled on to the toothed bar 29 by means of a spring 33. The distance between the teeth 30 is half the distance between the teeth of the toothed bar 29, so that the tubular rod 4 can be coupled with the bar 28 every half pitch of the teeth of the toothed bar 29. The horizontal arm of the angle lever 31 is connected by means of a connecting rod 34 to the levers 35 rotationally mounted on the axle 5. In order to lift the axle 5, the rods 4 and 28 are disengaged by pressing the fingers against the ends of the levers 35.

Upon the tubular member 10 being lowered and brought into contact with the tubular member 26 of the can 14, the two tubular members are connected by means of a screw nut 36, (shown in Figs. 7 and 9). The tubular member 26 is secured in the opening of the lid 27 of the can 14 and in the opening of the cross member 37 of the said lid by soldering, and this may be carried out with every can in which the milk has heretofore been delivered to the town. The tubular member 26 is provided with a ball valve 38 which automatically closes the can 14 when the latter is placed in the normal position, as shown in Fig. 7, and opens it when it is turned upside down, as shown in Fig. 9.

The two tubular members 10 and 26 having been connected together, the can 14 together with the plate 3 and the shaft 5 is lifted and inverted upside down by means of a pulley 39 on which two cables 40 are wound. The said cables 40 extend through the upper parts of the posts 2 and between the curved guides 41 and 42, between which the said cables are guided on pulleys 43, the ends of the cables 40 being secured to pivots 44 fixed to the rods 4. Each pivot 44 has a roller 45 rotationally mounted thereon, as shown in Fig. 2, the said rollers being guided in a curved slot between the guides 41 and 42. The guides 41 and 42 are rigidly connected together by means of yokes 46 and their ends are secured to the posts 2. In each post 2 a slot 47 is provided under the lower ends of the guides 41 and 42 in which the pivot 44 is movable, when the can 14 is in its lower position; above the upper ends of the guides 41 and 42 a slot 48 is provided in each post 2 in which the pivot 44 is movable, when the can 14 is in its upper position. When the pulley 39 is rotated, the cables lift the pivots 44 in the slots 47 while the rollers 45 travel inside the posts 2. When the rollers 45 arrive at the lower ends of the guides 41 and 42, they begin to roll between the said guides, and the sockets 6, which till now were concealed inside the posts 2, are at the same time moved upwards, being raised above the spring loaded projections 49, as shown in Fig. 5, the projections 49 being forced outwards under the influence of the springs. As the pulley 39 is further rotated, the rollers 45 roll in the curved slot between the guides 41 and 42, as shown in Fig. 2, and the can with the frame consisting of the plate 3 and rods 4 is rotated around the shaft 5 supported by the projections 49.

The pivots 44 reaching the upper ends of the guides 41 and 42 pass then over to the vertical slots 48 and the can, inverted upside down, continues to be lifted vertically together with the shaft 5. When the lower ends of the sockets 6 are lifted above the spring-loaded projections 50, shown in Fig. 10, and the pulley 39 is released, the sockets 6 with the shaft 5 rest on the said projections and the can 14 is thus secured in the inverted position.

During the rotation of the can 14, the tubular member 10 will be rotated together with the cone 9 around the axle 5 and the radial passage 51 provided in the said cone will come to lie opposite the tubular member 12. The latter member 12 is connected to a cock 53 provided below the measuring tank 13, the cone 54 of which cock is provided with a passage 54'. When the cone 54 is in the position shown in Fig. 7, the connection between the tubular member 12 and the tank 13 and that between the tank 13 and the outlet 55 are closed. If the cone 54 is turned to the right through an angle of 45°, the tubular member 12 will be connected to the tank 13, and if turned to the left, the outlet 55 will be connected to the tank 13.

The tubular member 10 is provided with a thin pipe 56 which terminates near the end of the tubular member 10 with a small ball valve 57 and is connected at the opposite end to the passage 58 provided in the cone 9. With the can 14 in the lower position, the passage 58 is closed, as shown in Fig. 8, and when the can is in the upper position, the passage 58 is connected to an opening 59 in the case 8, which opening is connected to the pipe 60, whereby air is introduced into the can 14 in the place of the milk that flows out of the can. The pipe 60 terminates in a filter 61 of any suitable type, as shown in Fig. 5, which is adapted to purify the air mechanically as well as chemically.

When the tubular member 12 is connected by means of the cock 53 to the tank 13, the air will flow through the filter 61, pipe 60, opening 59, passage 58, pipe 56 and the tubular member 26 to the can, in which it flows into the milk and agitates it. The milk flows from the can 14, through the tubular member 26 and the tubular member 10, the passage 51, the tubular member 12 and the cock 53 to the tank 13. After a suitable quantity of milk has been admitted to the measuring tank 13, which is provided with horizontal marking lines or a scale (for instance denoting ½, 1 and 2 litres, etc.), the cone 54 of the cock 53 is turned and the tank 13 is connected to the outlet 55, so that the milk now flows into the vessel that has been put underneath the outlet.

To prevent the milk from being poured out through the upper opening 62 of the measuring tank 13 (see Fig. 7), below the said opening, there is provided a float 63 with a cone which closes the opening 62 before the milk can reach the said opening. In order that the air entering the tank 13 may be purified, the opening 62 is provided with a filter (not shown) similar to the filter 61.

Fig. 6 illustrates a modification of the invention according to which three separate measuring tanks 13a, 13b, and 13c are adapted to measure automatically different quantities of milk, i. e., ½, 1 and 2 litres. It will be seen that the tubular member 12 is connected to a horizontal pipe 64 provided with three separate cocks 54 for each of the measuring tanks. The milk will flow only to that tank (13a, 13b, or 13c), the cock of which has been opened with respect to the tubular member 12.

It is to be understood that the details for carrying the invention into effect may be modified in various respects without in any way departing from the scope of the invention as claimed in the appended claims.

What we claim is:

1. A milk distribution apparatus comprising at least one stationary measuring tank, a horizontal axle 5 to which the said measuring tank is rigidly connected, a frame rotatably mounted around the said axle and adapted to turn the can 14 filled with milk upside down, a tubular member 10 to the outlet of which the measuring tank is connected, which tubular member 10 is mounted rotatably with respect to said measuring tank, a tubular member 26, which the tubular member 10 is adapted to connect to the said measuring tank, a lid 27 closing the milk can, and in which the tubular member 26 is arranged, and means adapted to turn the can filled with milk together with the said tubular members 10 and 26 upside down, the arrangement being such that the milk will flow from the can through the said tubular members to the measuring tank and from the latter to the vessel put under the outlet of the measuring tank and air will flow through the said tubular members into the can.

2. A milk distribution apparatus as claimed in claim 1, wherein the said frame is built-up of a can supporting plate suspended by means of telescopic rods 4, 28 from the horizontal axle 5, the ends of which are slidably mounted along vertical posts.

3. A milk distribution apparatus as claimed in claim 1, wherein the said frame is built-up of a can supporting plate suspended by means of telescopic rods 4, 28 from the horizontal axle 5, the ends of which are slidably mounted along vertical posts, the said vertical posts and telescopic rods being made tubular.

4. A milk distribution apparatus as claimed in claim 1, wherein the said frame is built-up of a can supporting plate suspended by means of telescopic rods 4, 28 from the horizontal axle 5, the ends of which are slidably mounted along vertical posts, the said transverse axle 5 being provided at the ends with sockets at right angles thereto, which sockets clamp the vertical posts.

5. A milk distribution apparatus as claimed in claim 1, wherein the said frame is built-up of a can supporting plate suspended by means of telescopic rods 4, 28 from the horizontal axle 5, the ends of which are slidably mounted along vertical posts, and the internal rod 28 of the rotary frame is provided with a toothed bar 29 with which engages a spring loaded ratchet lever secured to the external tubular rod 4.

6. A milk distribution apparatus as claimed in claim 1, wherein the said frame is built-up of a can supporting plate suspended by means of telescoping rods 4, 28 from the horizontal axle 5, the ends of which are slidably mounted along vertical posts, and the internal rod 28 of the rotary frame is provided with a toothed bar 29 with which engages a spring loaded ratchet lever secured to the external tubular rod 4, the ratchet lever being provided with two teeth, the distance between which is half the distance between the teeth of the toothed bar 29 of the internal rod 28.

7. A milk distribution apparatus as claimed in claim 1, wherein the said frame is built-up of a can supporting plate suspended by means of telescopic rods 4, 28 from the horizontal axle 5, the ends of which are slidably mounted along vertical posts, the said horizontal axle 5 being provided at the ends with sockets at right angles thereto, which sockets clamp the vertical posts and are connected by means of a transverse iron bar to which the measuring tank is secured so that the said measuring tank forms a rigid set with the axle 5 of the frame arranged slidably with respect to the vertical posts.

8. A milk distribution apparatus as claimed in claim 1, wherein the said frame is built-up of a can supporting plate suspended by means of telescopic rods 4, 28 from the horizontal axle 5, the ends of which are slidably mounted along vertical posts, the can supporting plate being provided with a device adapted to grasp laterally the bottom of the can and centre it exactly with respect to the said plate.

9. A milk distribution apparatus as claimed in claim 1, wherein the said frame is built-up of a can supporting plate suspended by means of telescopic rods 4, 28 from the horizontal axle 5, the ends of which are slidably mounted along vertical posts, the can supporting plate being provided with a device adapted to grasp laterally the bottom of the can and centre it exactly with respect to the said plate, which device comprises slots 22 in which bolts 15 are slidably arranged and connected to sliding members 20, 21 capable of being moved one towards the other by means of a lever 16 provided with a ratchet member adapted to engage an indentation 24 on the can supporting plate and fix the said lever in position.

10. A milk distribution apparatus as claimed in claim 1, wherein the said frame is built-up of a can supporting plate suspended by means of telescopic rods 4, 28 from the horizontal axle 5, the ends of which are slidably mounted along vertical posts, and wherein a pulley 39 is arranged, on which cables 40 are wound, said cables being extended through the upper parts of the posts and the ends 2 of the cables being attached to the frame supporting the can.

11. A milk distribution apparatus as claimed in claim 1, wherein the tubular member 10 is secured in a cone 9 mounted tightly and rotatably in a case 8 provided with a tubular member 12 which connects the said case 8 to the measuring tank, the case 8 being rigidly connected to the horizontal axle 5 around which the frame 3, 4 supporting and clamping the can is capable of being rotated to turn the can upside down, and being provided, in a plane at right angles to the axle, with a slot 11 in which the tubular member 10 can slide.

12. A milk distribution apparatus as claimed in claim 1, wherein the tubular member 10 is secured in a cone 9 mounted tightly and rotatably in a case 8 provided with a tubular member 12 which connects the said case 8 to the measuring tank, the case 8 being rigidly connected to the horizontal axle 5 around which the frame 3, 4 supporting and clamping the can is capable of being rotated to turn the can upside down, and being provided, in a plane at right angles to the axle, with a slot 11 in which the tubular member 10 can slide, and wherein the rotatable cone 9 is provided with a radial passage 51 which, when the rotating tubular member 10 is in its upper position, is connected to the tubular member 12 leading to the measuring tank.

13. A milk distribution apparatus as claimed in claim 1, wherein the tubular member 10 is secured in a cone 9 mounted tightly and rotatably in a case 8 provided with a tubular member 12 which connects the said case 8 to the measuring tank, the case 8 being rigidly connected to the horizontal axle 5 around which the frame 3, 4 supporting and clamping the can is capable of being rotated to turn the can upside down, and being provided, in a plane at right angles to the axle, with a slot 11 in which the tubular member 10 can slide, and wherein the rotatable cone 9 is provided with a radial passage 51 which, when the rotating tubular member 10 is in its upper position, is connected to the tubular member 12 leading to the measuring tank, the rotating cone 9 being provided with an air passage 58 connected to a pipe 56 arranged in the tubular member 10 which is secured within the said cone, and the said passage 58, when the tubular member 10 is in its upper position, being connected to an opening 59 in the case 8 through which opening 59 and pipe 56 air is allowed to flow to and enter the can.

14. A milk distribution apparatus as claimed in claim 1, wherein the tubular member 10 is secured in a cone 9 mounted tightly and rotatably in a case 8 provided with a tubular member 12 which connects the said case 8 to the measuring tank, the case 8 being rigidly connected to the horizontal axle 5 around which the frame 3, 4 supporting and clamping the can is capable of being rotated to turn the can upside down, and being provided, in a plane at right angles to the axle, with a slot 11 in which the tubular member 10 can slide, and wherein the rotatable cone 9 is provided with a radial passage 51 which, when the rotating tubular member 10 is in its upper position, is connected to the tubular member 12 leading to the measuring tank, a pipe 60 through which the air is introduced into the can being provided with a filter 61 for mechanically and chemically purifying the air.

ADOLF RINDL.
HONORATA RINDL.